_(12)_ United States Patent
Olson et al.

(10) Patent No.: US 7,730,499 B2
(45) Date of Patent: *Jun. 1, 2010

(54) PROTOCOL AGNOSTIC REQUEST RESPONSE PATTERN

(75) Inventors: Lance E Olson, Sammamish, WA (US); Henrik Frystyk Nielsen, Seattle, WA (US); Henry L Sanders, Kirkland, WA (US); Richard L Firth, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1623 days.

This patent is subject to a terminal disclaimer.

(21) Appl. No.: 10/970,513

(22) Filed: Oct. 21, 2004

(65) Prior Publication Data

US 2005/0055398 A1 Mar. 10, 2005

Related U.S. Application Data

(62) Division of application No. 09/818,447, filed on Mar. 27, 2001, now Pat. No. 6,996,833.

(51) Int. Cl.
*G06F 9/44* (2006.01)
*G06F 15/16* (2006.01)

(52) U.S. Cl. ........................ 719/328; 709/230
(58) Field of Classification Search ................ 719/310, 719/328; 709/228, 230, 238, 231, 232, 246
See application file for complete search history.

(56) References Cited

U.S. PATENT DOCUMENTS

| | | | |
|---|---|---|---|
| 5,710,908 A | 1/1998 | Man | |
| 5,894,557 A * | 4/1999 | Bade et al. | 709/228 |
| 6,047,319 A | 4/2000 | Olson | |
| 6,134,581 A | 10/2000 | Ismael et al. | |
| 6,173,316 B1 | 1/2001 | De Boor et al. | |
| 6,176,883 B1 | 1/2001 | Holloway et al. | |
| 6,182,109 B1 | 1/2001 | Sharma et al. | |
| 6,356,949 B1 * | 3/2002 | Katsandres et al. | 709/238 |
| 6,393,467 B1 | 5/2002 | Potvin | |
| 6,398,105 B2 * | 6/2002 | Ramberg et al. | 235/375 |
| 6,449,719 B1 | 9/2002 | Baker | |
| 6,456,632 B1 | 9/2002 | Baum et al. | |
| 6,654,794 B1 | 11/2003 | French | |
| 2002/0161673 A1 | 10/2002 | Lee et al. | |

OTHER PUBLICATIONS

Sturman "Object-Oriented Support For Specification Of Distributed Protocols" 1996 IEEE, pp. 133-137.*
Brustoloni et al. "User-Level Protocol Servers With Kernel-Level Performance" 1998 IEEE, pp. 463-471.*
Conrad et al. "Testing Environment For Innovative Transport Protocols" 1998 IEEE, pp. 292-296.*

* cited by examiner

*Primary Examiner*—Van H Nguyen
(74) *Attorney, Agent, or Firm*—Workman Nydegger

(57) ABSTRACT

A system and method for facilitating communications over a protocol is provided. The system includes a class factory that holds identifiers associated with determining which, if any, registered protocol object creator should be employed to create a protocol object. The protocol object implements an abstract network protocol base class. The protocol object is employed to abstract details of communicating over a protocol and to provide a byte stream interface to communications occurring over the protocol, while removing protocol specific code from an application program. The method includes creating an instance of a protocol object from a source of registered protocol handlers based on a request to communicate over a protocol and using a base class API to communicate over the protocol through the protocol object.

15 Claims, 12 Drawing Sheets

CLASS WEB_REQUEST

CLASS WEB_RESPONSE

PROTOCOL AGNOSTIC REQUEST RESPONSE PATTERN

CROSS-REFERENCE TO RELATED APPLICATIONS

This application is a divisional of U.S. patent application Ser. No. 09/818,447, filed Mar. 27, 2001, entitled "PROTOCOL AGNOSTIC REQUEST RESPONSE PATTERN," the entirety of which is incorporated herein by reference.

TECHNICAL FIELD

The present invention relates generally to computer programming and more particularly to simplifying communications over one of a plurality of protocols by providing network objects operable to abstract protocol specific communication details.

BACKGROUND OF THE INVENTION

As has more applications, services and content sources (collectively "resources") have become available on servers accessible over networks, it has become more common for remote users and/or programs (collectively "consumers") to access those resources on such servers over such networks. But communicating with a resource on a server, via a network requires formatting communications consistently with a protocol supported by the network and/or server, which complicates such communications. There are many protocols supported by many different networks and/or servers. For example, messages traversing the Internet can be formatted in protocols including, but not limited to, Hypertext Transfer Protocol (HTTP), File Transfer Protocol (FTP) and Simple Mail Transport Protocol (SMTP). Such a diversity of protocols facilitates communications between a wide range of consumers and resources in a variety of methods. But such diversity also leads to problems for programmers trying to access resources available on servers reachable through different networks and by different protocols.

Conventionally, a program written to access a resource provided over a network had to include code specific to the protocol employed to transport messages across the network. For example, a programmer writing a peer-to-peer application for sharing files across a network had to include code specific to the protocol between the peer processes. Including such protocol specific code in a program can negatively impact writing such a program by requiring the programmer(s) involved in writing the program to learn and account for protocol details. Learning such protocol specific details, and coding to account for such protocol specific details can increase program complexity while reducing program flexibility, thus increasing programming costs. Since protocols can change, program flexibility is important to program utility and lifespan, and thus to reducing lifetime costs associated with a program. For example, a program written to communicate specifically via HTTP 1.0 may not be able to communicate via HTTP 1.1. Thus, the program may need to be rewritten and recompiled to take advantage of the newer protocol, adding complexity and related cost to the program.

Programmers writing programs that seek to interact with resources addressable by a URI (Uniform Resource Identifier) typically are required to know the URI, to know the protocol employed to access the URI and to write code specific to the protocol required to access that URI. Thus, changing the URI of a resource could require a program to be rewritten and recompiled, thus introducing opportunities to introduce new bugs into a system. Thus, conventional systems limit the relocatability of resources.

Programmers are further constrained by conventional systems and methods that require a program to transmit and receive messages in message sizes and formats dictated by a protocol. For example, a protocol supporting transferring email messages may require an email message comprising a thousand words to be transmitted as a series of packets with headers and/or trailers according to that protocol. Similarly, a book chapter comprising twenty kilobytes of data may be received as a series of one kilobyte blocks according to a second protocol. Such protocol specific size restrictions add complexity to programs and limit the ability of one program to access multiple different resources available over a variety of protocols.

Thus a system and/or method for simplifying application communications over a plurality of protocols is still needed to mitigate problems associated with conventional systems.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention provides and a system and method for a program to communicate over a variety of protocols without having to rewrite and recompile the program when interacting with different protocols. The system further facilitates a program interacting with a new protocol without having to rewrite and recompile the program. Further, the system facilitates receiving and sending messages to a resource over a network through a byte stream interface, rather than through a protocol specific interface. Such a byte stream interface can be read and/or written by an application without accounting for protocol specific formatting, sizing and/or packaging details, thus mitigating formatting and sizing problems associated with conventional systems.

The system includes a class factory operable to select protocol object creators that produce objects associated with the various protocols. Which protocol object creator to employ can be determined by identifiers associated with the resource to be accessed, the class factory and the protocols. The identifiers can be, for example, registered URIs. When a programmer desires to write an application that will access a resource addressable by the identifier, the programmer will be able to request that the class factory provide an object suitable for communicating over the protocol(s) by which the resource can be reached. The programmer will not be required to learn or account for details associated with communicating by the protocol(s) employed to communicate with the resource. Rather, the programmer will be able to treat data received from resources as a byte stream. Thus, complexity problems associated with conventional systems are mitigated.

If a suitable protocol object creator has been registered with the class factory, then the class factory will employ the registered protocol object creator to create and provide a protocol object capable of communicating over a desired protocol. The protocol object will make messages received over the protocol appear as a continuous byte stream to the programmer. In addition, the protocol object facilitates sending messages by writing to a continuous byte stream. Thus, size problems associated with reading and writing in conventional systems are mitigated.

The system includes a protocol object creator registration system that facilitates making new protocol object creators (and thus new protocol objects) available to applications. When such protocol object creators become available, they can be registered with the class factory, thus facilitating creating associated new protocol objects. Such registration makes protocol objects available to the application program without requiring a rewrite or recompile of the application program. Thus, problems associated with program flexibility and adaptability are mitigated.

The present invention also provides a method for allowing an application program to communicate over different protocols. The method includes registering protocol handlers with a protocol object generating process. The method includes accepting a request from an application seeking to communicate with an entity addressable via an identifier (e.g., a URI). The method accepts the request and resolves which, if any protocol object generating process should be employed to generate a protocol object. The selected protocol object generating process then creates an instance of a protocol object from the registered protocol handlers. For example, if the application seeks to communicate with an entity reachable via HTTP, the method can return a protocol object capable of processing HTTP requests and responses. The protocol object is further operable to make such requests and responses appear as a byte stream to the application employing the protocol object, selectively removing protocol specific formatting details and/or characters from incoming data and selectively adding protocol specific formatting details and/or characters to outgoing data. The application program can then communicate with the resource through the protocol object by employing methods available through a base class API. For example, the application program can employ protocol object byte stream read and/or write methods to communicate with the resource.

To the accomplishment of the foregoing and related ends, certain illustrative aspects of the invention are described herein in connection with the following description and the annexed drawings. These aspects are indicative of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
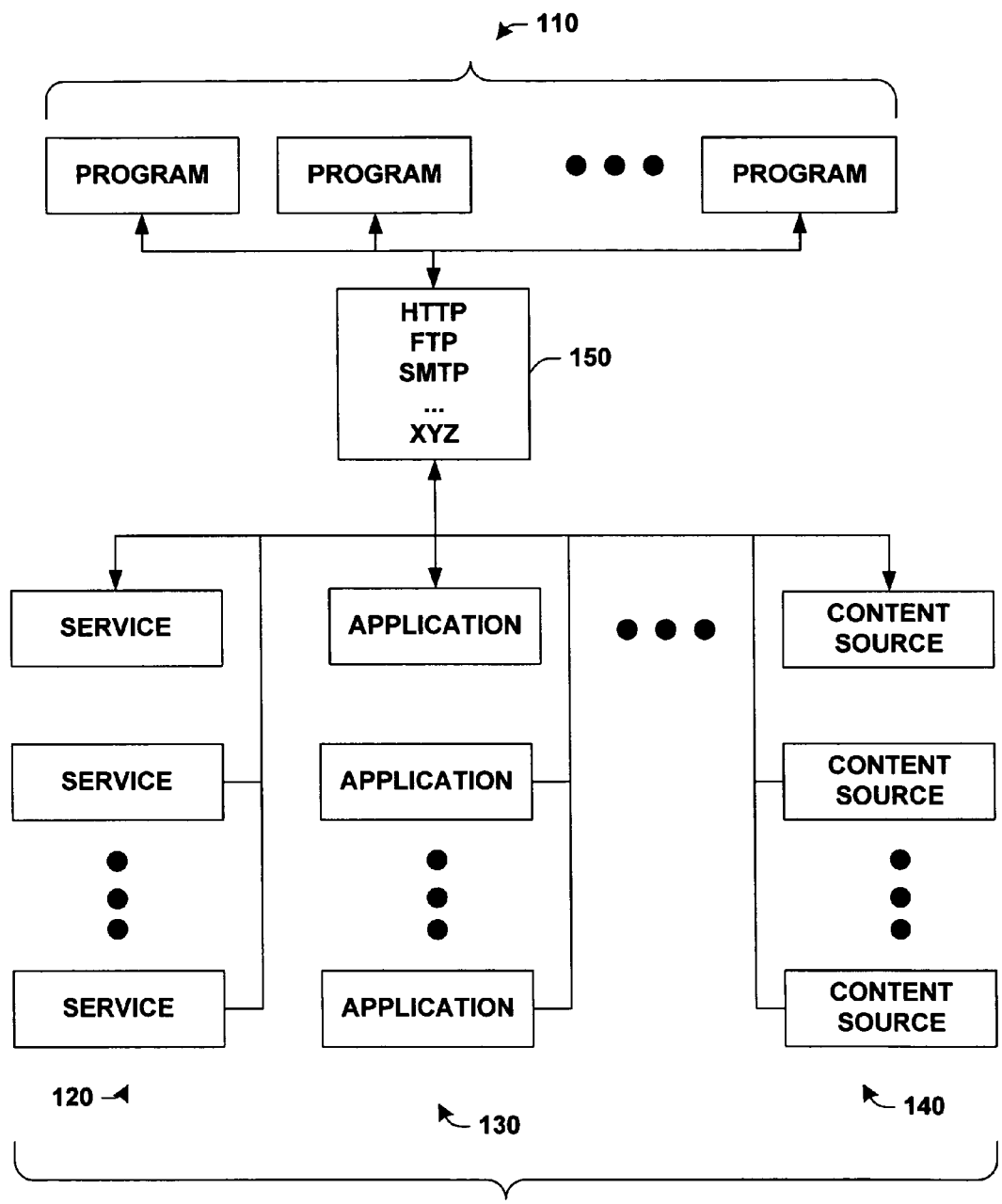
FIG. 1 is a block diagram illustrating a plurality of programs accessing a plurality of resources via a plurality of protocols, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

The term "component" refers to a computer-related entity, either hardware, a combination of hardware and software, software, or software in execution. For example, a component may be a process running on a processor, a processor, an object, an executable, a thread of execution, a program and a computer. By way of illustration, both an application running on a server and the server can be components.

The term "class factory" refers to a computer-related entity, either hardware, a combination of hardware and software, software, or software in execution. For example, a class factory may be a process running on a processor, a processor, an object, an executable, a thread of execution, a program and a computer. By way of illustration, both an application running on a server and the server can be class factories.

The term "creator" refers to a computer-related entity, either hardware, a combination of hardware and software, software, or software in execution. For example, a creator may be a process running on a processor, a processor, an object, an executable, a thread of execution, a program and a computer. By way of illustration, both an application running on a server and the server can be creators.

The term "constructor" refers to a computer-related entity, either hardware, a combination of hardware and software, software, or software in execution. For example, a constructor may be a process running on a processor, a processor, an object, an executable, a thread of execution, a program and a computer. By way of illustration, both an application running on a server and the server can be constructors.

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks) may be employed.

Referring initially to FIG. 1, a plurality of programs 110 are illustrated communicating with a plurality of services 120, a plurality of applications 130 and a plurality of content sources 140 via a plurality of protocols 150. The services 120, applications 130 and content sources 140 can be referred to collectively as the resources 160. While services 120, applications 130 and content sources 140 are illustrated as the resources 160, it is to be appreciated by one skilled in the art that the present invention facilitates communications between the programs 110 and any suitable resource with which communications over a protocol are possible.

Conventionally, a program desiring to communicate with a resource is required to include code specific to the protocol by which the program and the resource will communicate. For example, a program desiring to access a Hypertext Markup Language (HTML) Web page can be required to include code specific to the Hypertext Transfer Protocol (HTTP). Embedding such code in a program increases program complexity while reducing program flexibility. Thus, the present invention facilitates writing a program to interact with the resources 160 while remaining abstracted from the details of the plurality of protocols 150.

Figure 2:
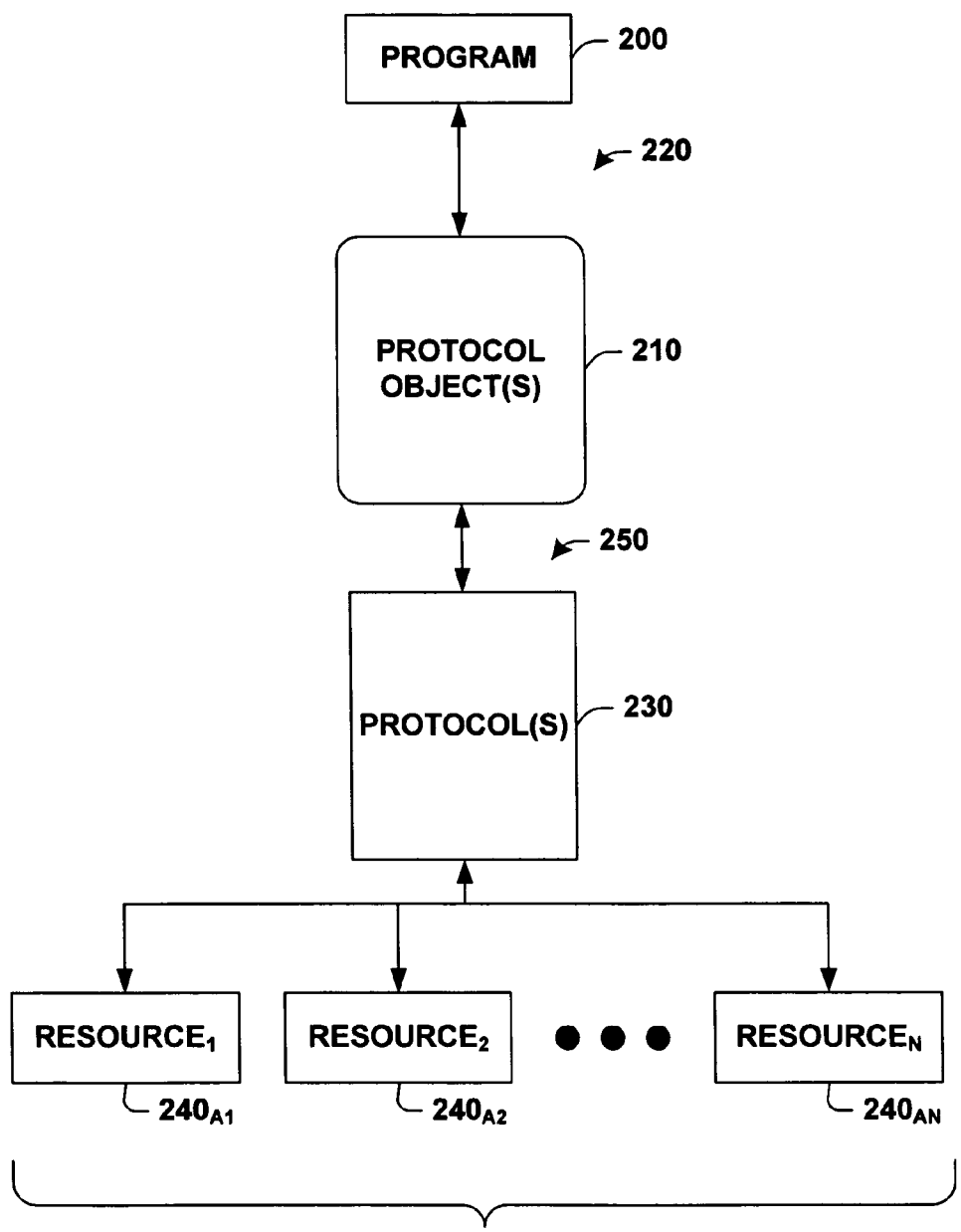
FIG. 2 is a block diagram illustrating a program employing protocol objects to access resources via a plurality of protocols, in accordance with an aspect of the present invention.

FIG. 2 is a schematic block illustrating a program 200 employing a protocol object 210 to access a plurality of resources 240 via one or more protocols 230. The program 200 can communicate with the protocol object 210 via a byte stream 220. The protocol object 210, however, can communicate with the resources 240 via a data stream 250, where data flowing in the data stream 250 is formatted in accordance with one or more protocols 230. Although one program 200 is illustrated, it is to be appreciated by one skilled in the art that a greater number of programs may be employed in accordance with the present invention. Similarly, while one protocol object 210 is illustrated, it is to be appreciated that a greater number of protocol objects 210 can be employed.

Conventionally, the program 200 would be required to format data intended for a first resource $240_{A1}$ in a manner consistent with a first protocol 230 through which the resource $240_{A1}$ could be accessed. By way of illustration, if the resource $240_{A1}$ were an HTML page, the program 200 could be required to include code specific to an HTTP protocol. By way of further illustration, if a second resource $240_{A2}$ were an FTP data source, then the program 200 could be required to include code specific to an FTP protocol. Including such protocol specific code in the program 200 can increase the program 200 complexity and cost. Furthermore, including such protocol specific code in the program 200 can limit the flexibility and thus shorten the lifespan of the program 200. If the program 200 desired to communicate with more than one resource, then the program 200 could be required to include code specific to each of the protocols with which it would interact, thus increasing the program 200 size and complexity.

The present invention thus provides a protocol object 210 that mitigates problems associated with requiring the inclusion of protocol specific code in the program 200. By way of illustration, if the resource $240_{A1}$ were an HTML page, the program 200 would not be required to include code specific to an HTTP protocol, rather the program 200 would communicate via a first byte stream 220 with a first protocol object 210. The first protocol object 210 would include the protocol specific code that facilitates communicating via the HTTP protocol. By way of further illustration, if the resource $240_{A2}$ were an FTP data source, then the program 200 would not be required to include code specific to an FTP protocol. Rather, the program 200 would communicate via a second byte stream 220 with a second protocol object 210. The second protocol object 210 would include the protocol specific code that facilitates communicating via the FTP protocol. The protocol objects 210 could convert the byte streams 220 to formats consistent with the protocol by which the desired resources are accessed. For example, a first protocol object 210 could convert a first byte stream 220 intended for the resource $240_{A1}$ into data consistent with an HTTP protocol while a second protocol object 210 could convert a second byte stream 220 intended for the resource $240_{A2}$ into data consistent with an FTP protocol.

The present invention thus mitigates complexity and inflexibility problems associated with conventional systems by providing protocol objects 210 that hide the protocol specific details from the program 200, making access to the resources 240 possible via a byte stream 220. The present invention thus simplifies writing applications that communicate with one or more resources via one or more protocols. Thus, writing applications that can read from a first resource via a first protocol and then write to a second resource via a second protocol is simplified. Furthermore, writing applications that read from resources that are mobile (e.g., change their URI) without requiring the application to be recompiled is simplified. By way of illustration, a program 200 may communicate with a resource $240_{A1}$ locatable via a first URI through a first protocol but then the resource $240_{A1}$ may change its URI. Conventionally, the program 200 may be required to add additional code to deal with a new protocol through which the resource $240_{A1}$ would be accessed. Including such additional code could require recompiling the program 200. But the present invention can accept, by way of illustration, a URI as an identifier to determine which of a plurality of protocol objects to employ to communicate with a resource. Thus, no additional code needs to be added to the program 200 to facilitate dealing with the different protocol and thus no recompilation is required.

Figure 3:
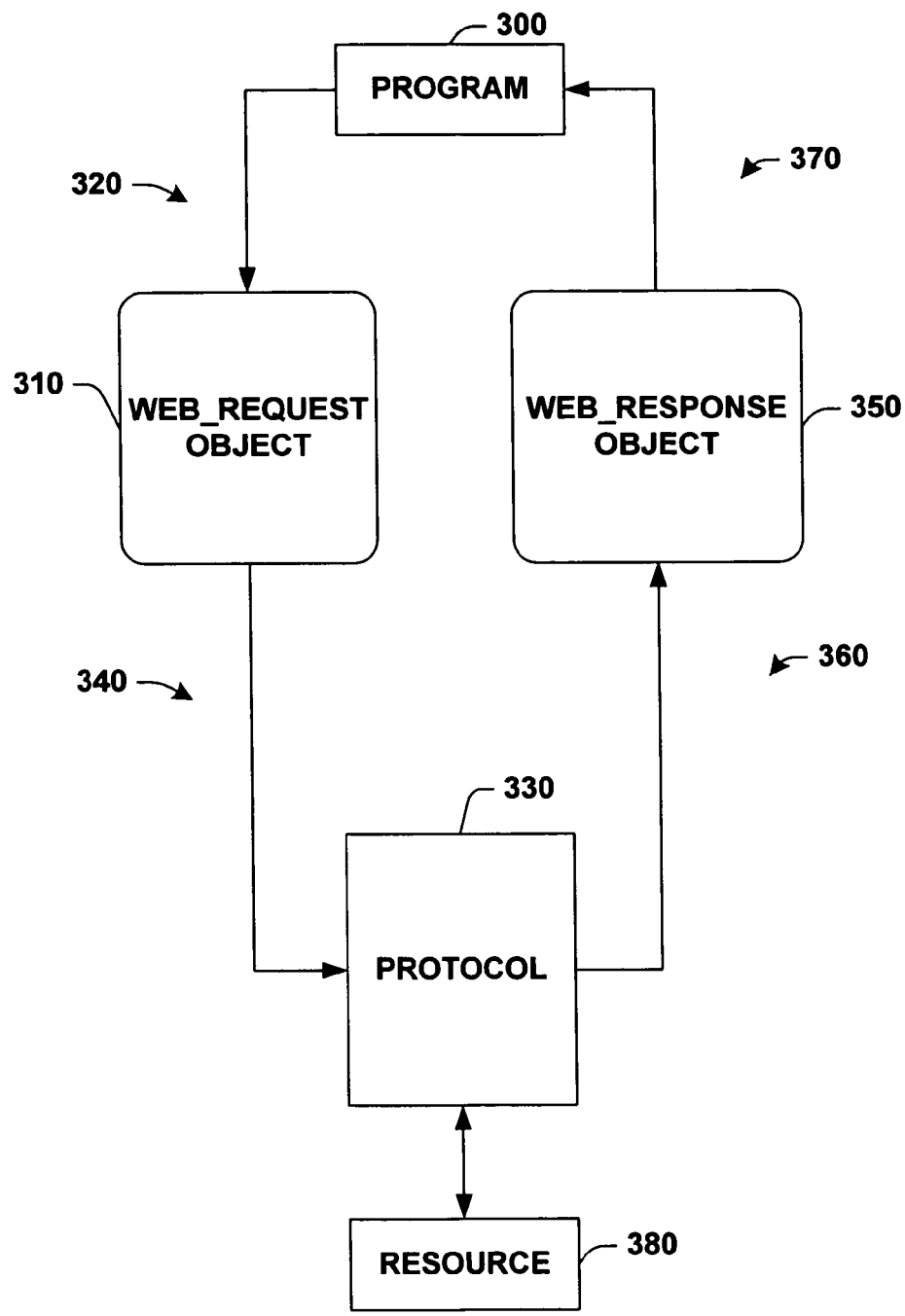
FIG. 3 is a block diagram illustrating a program employing a reading object and a writing object to access a resource via a protocol, in accordance with an aspect of the present invention.

Turning now to FIG. 3, a schematic block diagram illustrates a program 300 employing a reading object 350 and a writing object 310 to access a resource 380 via a protocol 330. The writing object 310 may be, for example, a WEB_REQUEST object, which accepts a byte stream 320 and produces data 340 consistent with the protocol 330. The reading object 350 may be, for example, a WEB_RESPONSE object, which produces a byte stream 370 from data 360 formatted consistently with the protocol 330. The writing object 310 and the reading object 350 thus make the resource 380 appear as a pair of byte streams to the program 300, simplifying the process of writing the program 300. Although a WEB_REQUEST object and a WEB_RESPONSE object are illustrated as examples of the writing object 310 and the reading object 350, it is to be appreciated by one skilled in the art that any appropriate reading and/or writing objects can be employed in accordance with the present invention. Furthermore, although the writing object 310 and reading object 350 are illustrated as two separate objects, it is to be appreciated by one skilled in the art that the reading and writing functionality may be accomplished in a greater or lesser number of separate, combined, and/or distributed objects. It is to be further appreciated that although a reading object 350 is illustrated, a reading component and/or a reader may perform the reading functionality. Any suitable reading component and/or reader may be employed in accordance with the present invention. Similarly, it is to be further appreciated that although a writing object 310 is illustrated, a writing component and/or writer may perform the answering functionality. Any suitable writing component and/or writer may be employed in accordance with the present invention.

Due to the functionality provided by the reading object 350 and the writing object 310, the program 300 is not required to include code specific to the protocol 330, but rather includes code that can be employed to generate the creation of the reading object 350 and the writing object 310. Such generating code can be employed to create objects that can be employed to communicate with a plurality of resources via a plurality of protocols. Furthermore, such generating code can be responsive to parameters input to the program 300, allowing the program 300 to be flexible. The input parameters may, for example, be associated with identifiers stored in a class factory (e.g., 520, FIG. 5) employed to select a protocol object creator to employ to create the reading object 350 and/or the writing object 310. Thus, with input parameters available to be passed through to a class factory callable by generic program code, the program 300 can be isolated from protocol specific details, increasing flexibility and lifespan over conventional systems. The program 300 may invoke such generating code one or more times, as needed, to communicate concurrently with one or more resources via one or more protocols. Thus, complexity and program size problems associated with conventional systems are mitigated.

Figure 4:
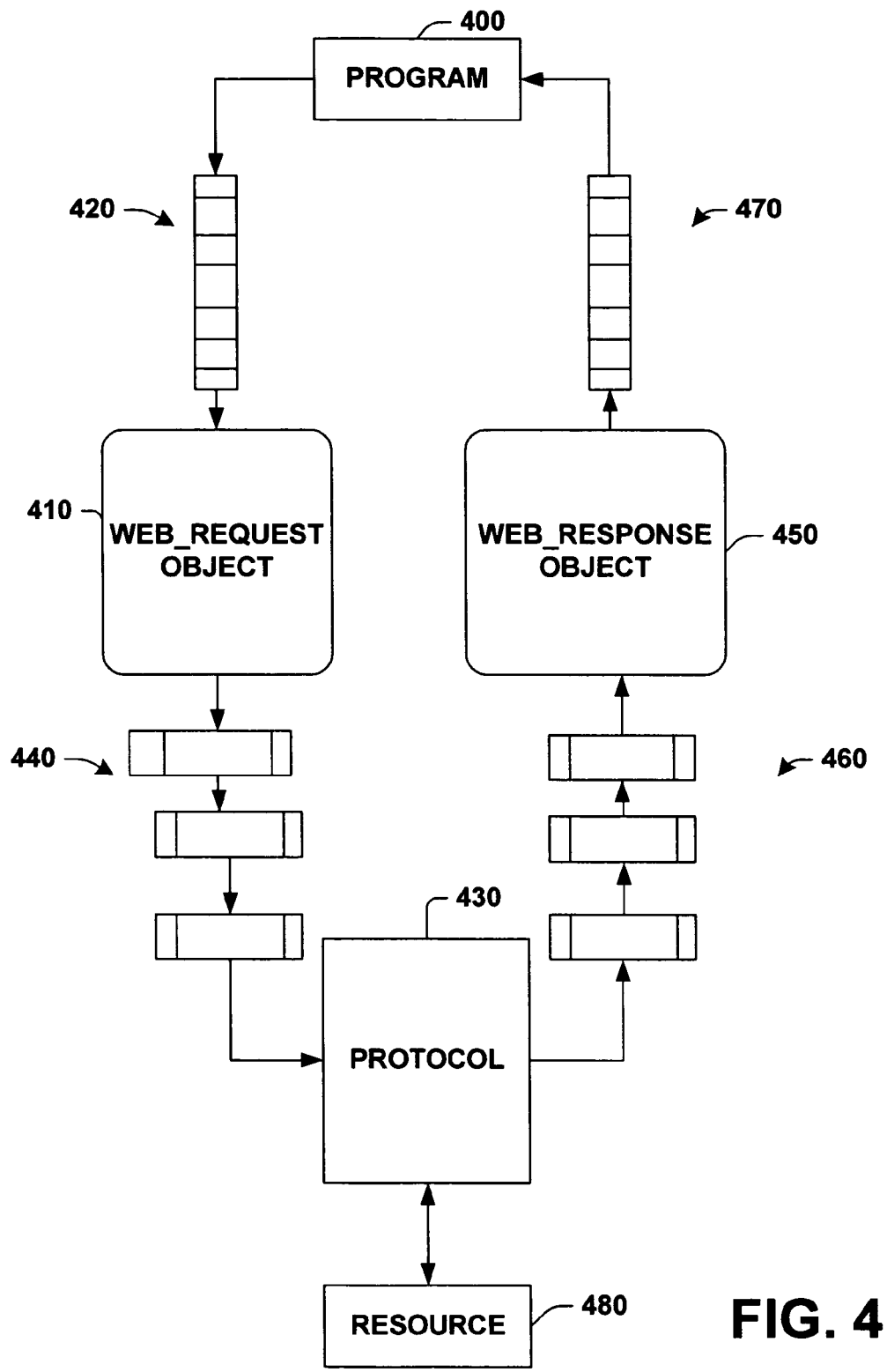
FIG. 4 is a block diagram illustrating a program employing a reading object and a writing object to access a resource via a protocol, the access being accomplished via a byte stream, in accordance with an aspect of the present invention.

FIG. 4 is a schematic block illustrating a program 400 employing a reading object 450 and a writing object 410 to access a resource 480 via a protocol 430, the access being facilitated by an outgoing byte stream 420 and an incoming byte stream 470. The program 400 can thus communicate with the resource 480 through relatively simple read and write methods provided by the reading object 450 and the writing object 410, rather than by relatively complicated protocol specific calls. The write methods can be employed to place one or more pieces of data in the outgoing byte stream 420 which is handled by the writing object 410. The writing object 410 can be, for example, a WEB_REQUEST object. The writing object 410 can take the byte stream 420 and produce, by way of illustration, one or more packets 440 formatted according to the protocol 430. Thus, code required to perform processing associated with producing such packets 440 is not included in the program 400 but rather is included in the object 410, with such code, and its functionality being accessible to the program 400 through the object 410. Similarly, the reading object 450 can be, for example, a WEB_RESPONSE object. The reading object 450 can accept, for example, one or more packets 460 of data formatted according to the protocol 430 and produce the byte stream 470. Although packets 440 and 460 are illustrated, it is to be appreciated by one skilled in the art that other data formats, including, but not limited to, aggregations, collections, packets and datagrams may be processed by the writing object 410 and the reading object 450. The data packets 440 and/or 460 may include one or more headers and/or footers and/or formatting characters required by the protocol 430. The reading object 450 may remove the one or more headers, footers and/or formatting characters associated with the protocol from the packets 460 to produce the byte stream 470. Similarly, the writing object 410 may add such headers, footers and/or formatting characters associated with the protocol 430 to the byte stream 420 to produce the packets 440.

While the program 400 is illustrated interacting with one outgoing byte stream 420 and one incoming byte stream 470, it is to be appreciated by one skilled in the art that the program 400 may concurrently communicate with one or more resources by one or more protocols, and therefore more than one outgoing byte stream 420 may be associated with the program 400 and more than one incoming byte stream 470 may be associated with the program 400. Similarly, more than one writing object 410 may be associated with the program 400 and more than one reading object 450 may be associated with the program 400.

Figure 5:
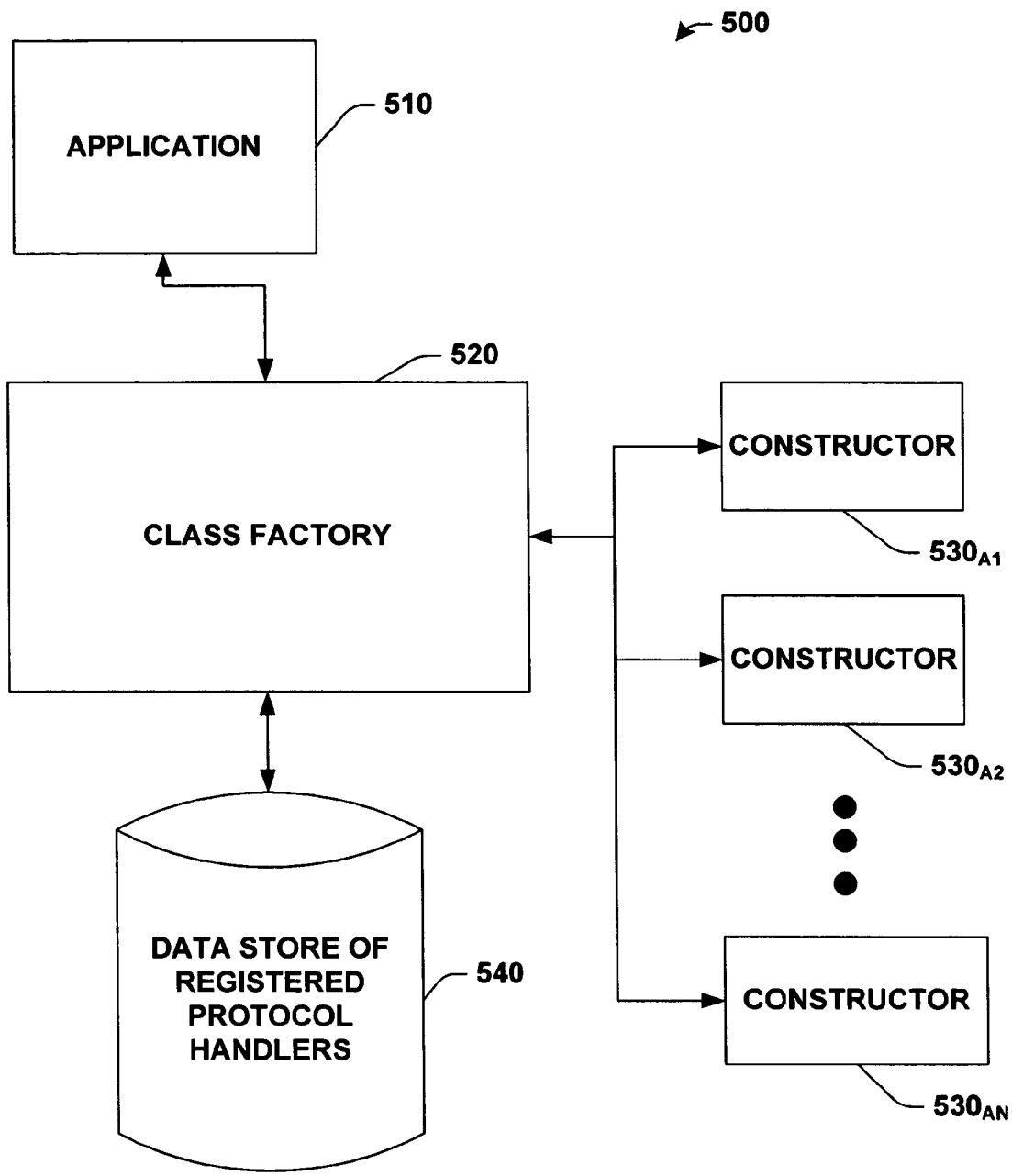
FIG. 5 is a block diagram illustrating a class factory accessing a data store of registered protocol handlers to determine which, if any, constructor to employ to create a protocol object to be used by an application, in accordance with an aspect of the present invention.

Referring now to FIG. 5, a system 500 for facilitating an application 510 communicating over a plurality of protocols is illustrated. The system 500 includes a class factory 520 that has access to a first constructor $530_{A1}$, and a second constructor $530_{A2}$ through an Nth constructor $530_{AN}$, N being an integer. The constructors $530_{A1}$, $530_{A2}$ through $530_{AN}$ can be referred to collectively as the constructors 530. The first constructor $530_{A1}$ may be operable to produce protocol objects that facilitate interacting with a first protocol (e.g., HTTP) while the second constructor $530_{A2}$ may be operable to produce protocol objects that facilitate interacting with a second protocol (e.g., FTP). To communicate with a resource (e.g., 480, FIG. 4) via a protocol (e.g., 430, FIG. 4) the application 510 can first request that a protocol object be created by the class factory 520. The class factory 520 can select an appropriate constructor to employ to construct such a protocol object based on an identifier associated with the resource (e.g., 480, FIG. 4) with which the application 510 seeks to communicate. By way of illustration, if the application 510 seeks to communicate with a resource identified by the URI http://www.abc.com/123.html then the class factory 520 may employ a constructor to produce a protocol object operable to interact with the HTTP protocol. By way of further illustration, if the application 510 seeks to communicate with a resource identified by the URI ftp://www.abc.com/123 then the class factory 520 may employ a constructor to produce a protocol object operable to interact with the FTP protocol.

Thus, in the example presented, the application 510 only needs to supply a URI to the class factory 520. The URI can be an input to the application 510 (e.g., a command line parameter, a field read from a file, a string input by a user) that is employed by the code that invokes the operations of the class factory 520. Thus, the application 510 can be insulated from protocol specific actions, thereby mitigating flexibility problems associated with conventional systems. The class factory 520 is then responsible for selecting an appropriate constructor, invoking a create method in the chosen constructor and returning a protocol object operable to facilitate the desired communication to the application 510. Thus, by moving creator selection to a class factory, that is external to the application 510, flexibility and complexity problems associated with conventional systems are mitigated. The class factory 520 can access a data store 540 of registered protocol handlers to facilitate determining which, if any, constructor to employ to create a protocol object for a desired communication. By way of illustration, the data store 540 of registered protocol handlers may store items including, but not limited to, a list of constructors associated with one or more URIs, a list of constructors associated with one or more URI prefixes and a list of rules for selecting a constructor based on a URI. While the previous sentence refers to lists, it is to be appreciated by one skilled in the art that the data store 540 can employ other data structures including, but not limited to, an array, a table, a database, a stack, a heap, a linked list, a heap and a data cube.

Figure 6:
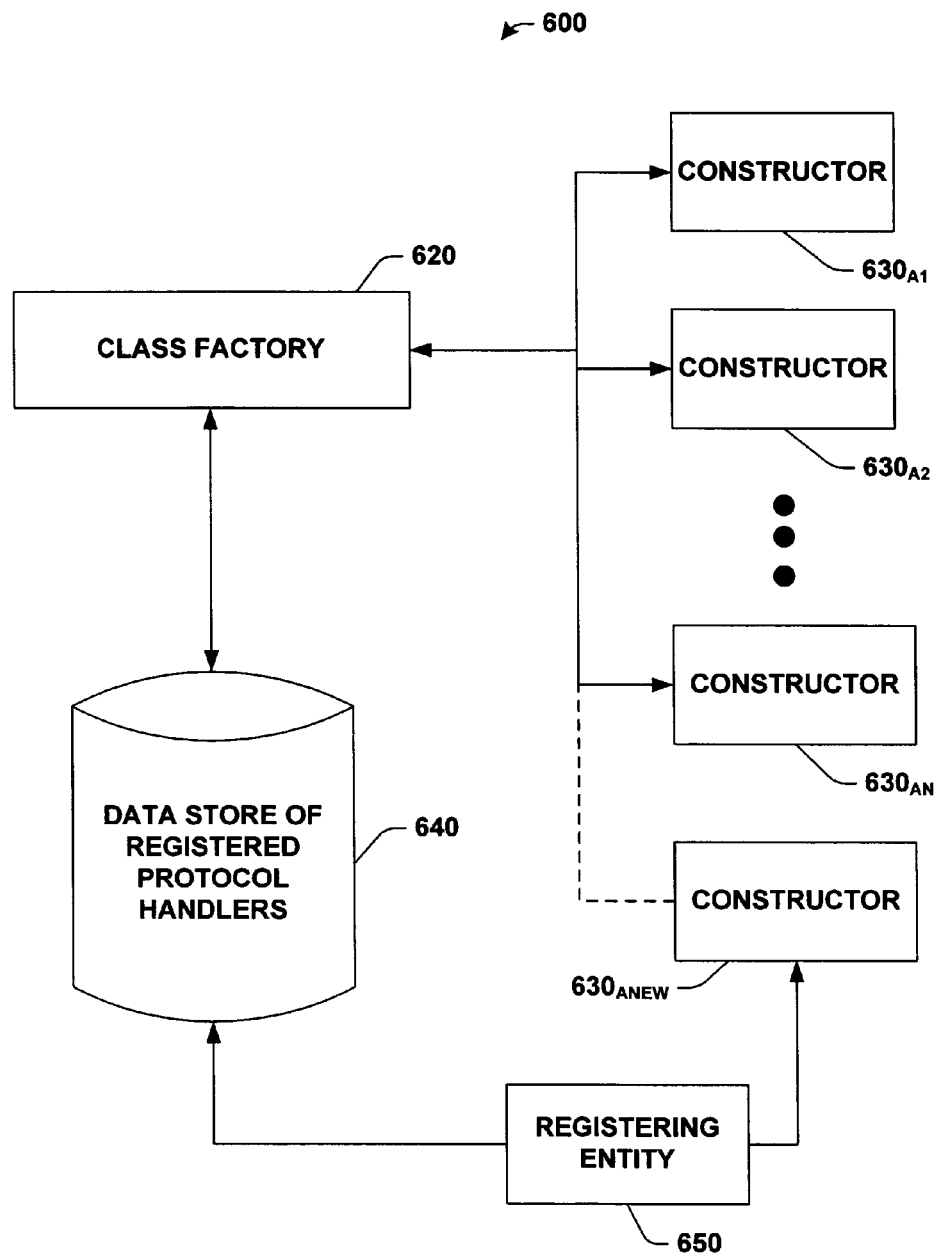
FIG. 6 is a block diagram illustrating a registering entity updating a data store of registered protocol handlers to facilitate a class factory employing a new constructor to create a new protocol object, in accordance with an aspect of the present invention.

One problem with conventional systems was the difficulty with which such systems responded to new protocols. Thus, turning to FIG. 6, a system 600 for registering new protocol object constructors with a class factory 620 is illustrated. Before the addition of a new constructor $630_{ANEW}$ and related registered protocol handler information, the class factory 620 had access to a first constructor $630_{A1}$ and a second constructor $630_{A2}$ through an Nth constructor $630_{AN}$, N being an integer. The first constructor $630_{A1}$ may be operable to produce protocol objects associated with a first protocol (e.g., HTTP), while the second constructor $630_{A2}$ may be operable to produce protocol objects associated with a second protocol (e.g., FTP). Information sufficient to determine which constructor, if any, is appropriate to employ to construct a protocol object to facilitate a desired communication can be stored in a data store 640 of registered protocol handlers. The data store 640 may store items including, but not limited to, a list of constructors associated with one or more URIs, a list of constructors associated with one or more URI prefixes and a list of rules for selecting a constructor based on a URI. While the previous sentence refers to lists, it is to be appreciated by one skilled in the art that the data store 640 can employ other data structures including, but not limited to, an array, a table, a database, a stack, a heap, a linked list, a heap and a data cube.

When a registering entity 650 desires to add a new protocol to the class factory 620 set of protocols for which constructors are available, the registering entity 650 will take at least two actions. The registering entity 650 will produce a new constructor $630_{ANEW}$, and the registering entity will register the new constructor $630_{ANEW}$ with the data store 640. Registering the new constructor $630_{ANEW}$ with the data store 640 may involve updating items including, but not limited to, a list of constructors associated with one or more URIs, a list of constructors associated with one or more URI prefixes and a list of rules for selecting a constructor based on a URI. While the previous sentence refers to lists, it is to be appreciated by one skilled in the art that updating the data store 640 can involve updating other data structures including, but not limited to, an array, a table, a database, a stack, a heap, a linked list, a heap and a data cube. Once the data store 640 is updated, then the class factory 620 can employ the new constructor $630_{ANEW}$ to create protocol objects associated with the new protocol. It is to be appreciated by one skilled in the art that although a registering entity 650 is illustrated, that an adding component may be employed to add an identifier to the data store 640 and that any suitable adding component may be employed with the present invention.

Adding a new constructor $630_{ANEW}$ operable to produce protocol objects associated with the new protocol can thus be completed without requiring changes to an application (e.g., 510, FIG. 5). To acquire a protocol object created by the new constructor $630_{ANEW}$, an application (e.g., 510, FIG. 5) would not require recompilation, thus mitigating lifespan problems associated with conventional systems. An application (e.g., 510, FIG. 5) may not even be aware that the new constructor $630_{ANEW}$ became available. By way of illustration, acquiring a protocol object operable to facilitate access to a resource through a new protocol may involve inputting a parameter to an application (e.g., 510, FIG. 5), and passing the parameter to existing generator code that will in turn access the class factory 620. The parameter may be a URI. To acquire a protocol object created by the new constructor $630_{ANEW}$, an application (e.g., 510, FIG. 5) could provide a URI to the class factory, which would be responsible for determining that the new constructor $630_{ANEW}$ was available and appropriate for the desired communication, and which would further be responsible for invoking the new constructor $630_{ANEW}$ and returning the protocol object(s) created by the new constructor $630_{ANEW}$. The class factory 620 will be able to interact with the new constructor $630_{ANEW}$ and an application will be able to interact with a protocol object created by the new constructor $630_{ANEW}$ if the new constructor implements a set of methods defined in an abstract network base class. Such abstract base class enabled access to the new constructor can thus be accomplished with no changes to the application program.

Figure 7:
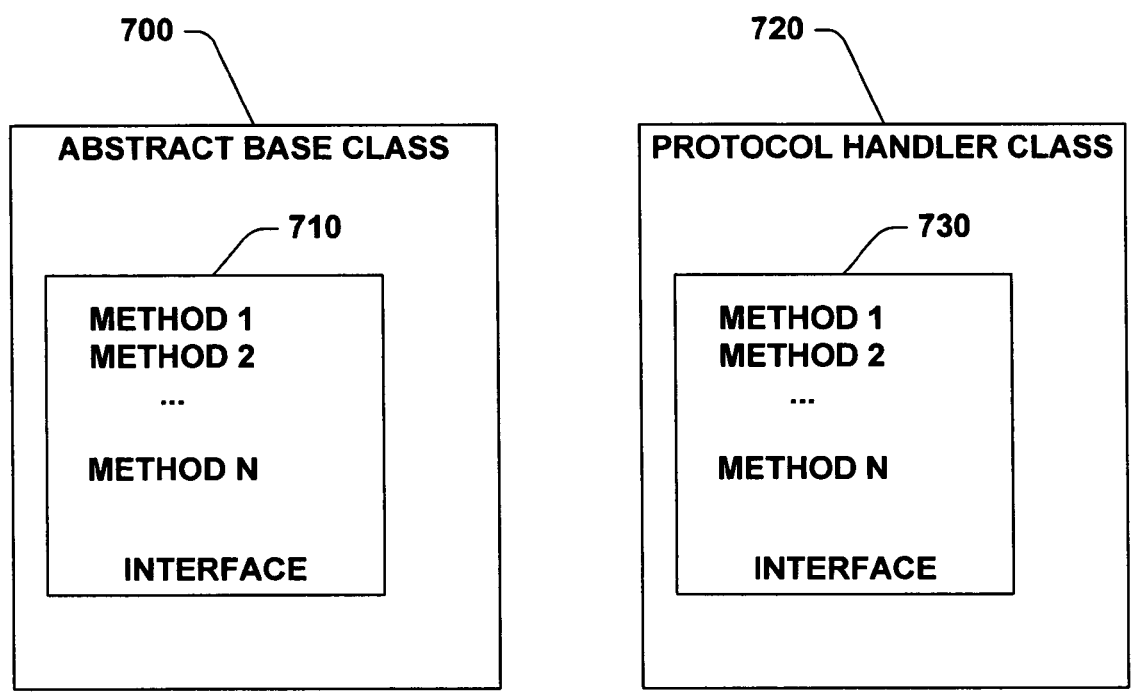
FIG. 7 is a block diagram illustrating an abstract base class and a protocol handler class, which inherits from the abstract base class, implementing the abstract base class, in accordance with an aspect of the present invention.

Thus, turning to FIG. 7, an abstract base class 700 and a protocol handler class 720 that inherits from the abstract base class 700 and which implements the abstract base class 700 are illustrated. The abstract base class 700 defines an interface 710, which includes N methods, N being an integer. The abstract base class 700 may also define one or more properties. The protocol handler class 720 inherits from the abstract base class 700, and implements with the interface 710. In an abstract base class, methods are defined but not implemented. The present invention employs such abstract base classes to define an interface that protocol handler classes can implement.

The interface 710 can have methods including, but not limited to, methods for creating an object, methods for writing to a byte stream, methods for reading from a byte stream, methods for adding protocol specific information to data, methods for removing protocol specific information from data, methods for registering a protocol object creator and methods for determining the status of a communication. It is to be appreciated by one skilled in the art that some methods may be visible to an application program interacting with a protocol handler class object 720 (e.g., write to byte stream, read to byte stream) while other methods may not be visible to such an application program (e.g., add protocol header, remove protocol header). It is to be further appreciated that some methods (e.g., creator methods) may be invoked by a class factory (e.g., 620, FIG. 6). The implementation of the interface 710 by the class specific object 720 facilitates implementing class factory functionality, with such functionality being removed from an application program, which thus mitigates application program complexity problems.

Figure 8:
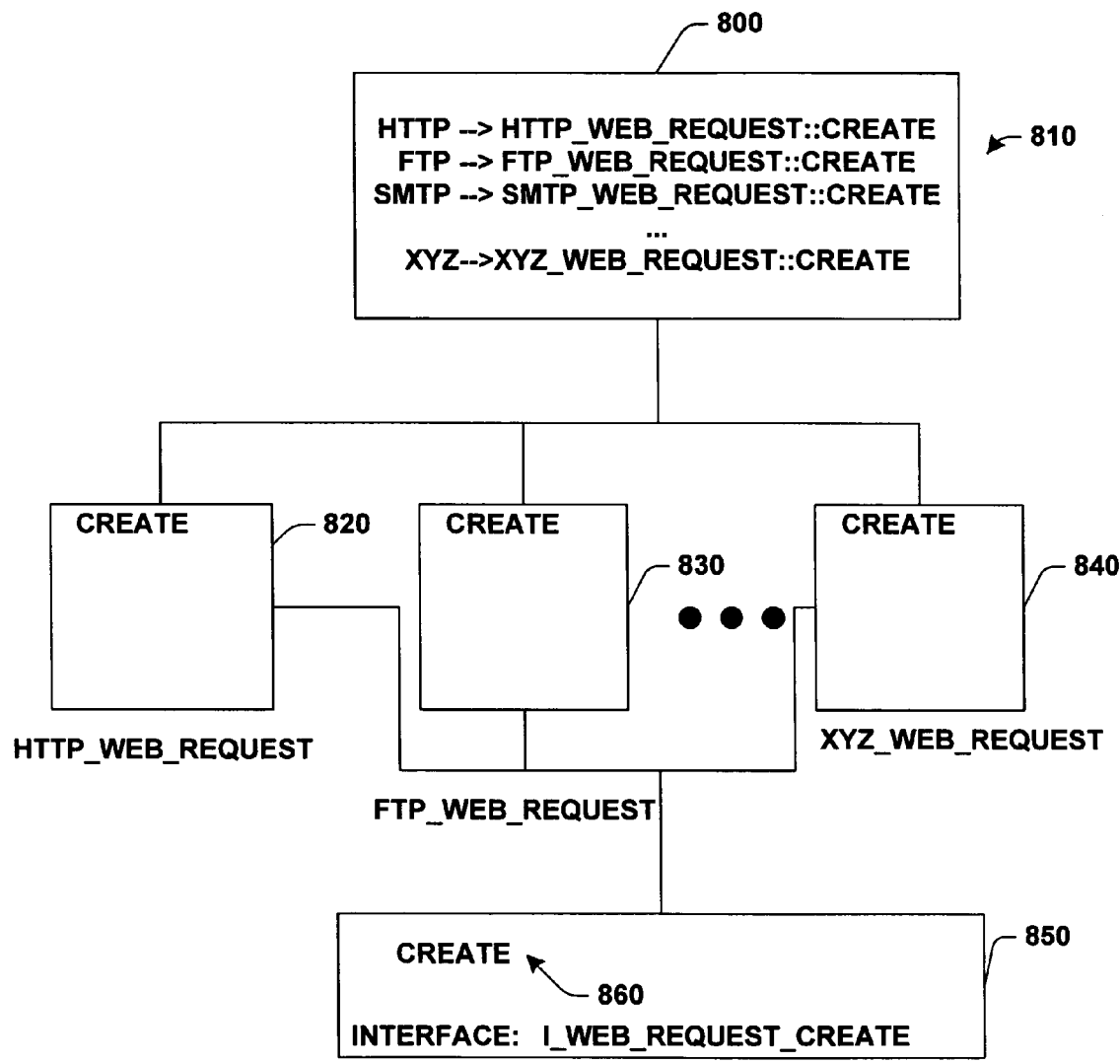
FIG. 8 is a block diagram illustrating a class factory registry of protocol object creators that have implemented a creator defined in an interface, in accordance with an aspect of the present invention.

Thus, turning to FIG. 8, a block diagram illustrates a class factory 800 with a registry 810 of protocol object creators. The registry 810 of protocol object creators can include identifiers that can be employed to resolve a URI. Such identifiers may be associated with parameters that can be input to an application (e.g., 510, FIG. 5). The registry 810 can be employed to associate identifiers with protocol object creators from protocol objects that have implemented an interface 850 and that in so doing have overridden the one method in the interface 850, create 860. By way of illustration, the creator method 820 may be an implementation of the interface 850 create method 860, with the creator method 820 defined by a protocol object class associated with facilitating HTTP communications. By way of further illustration, the creator method 830 may be an implementation of the interface 850 create method 860, with the creator method 830 being defined by a protocol object class associated with facilitating FTP communications.

The registry 810 can be indexed, for example, by a URI, and/or by a prefix associated with a URI. For example, the prefix "http" in a URI http://www.abc.com/123.html may be employed as an identifier in the registry 810. The identifier can be employed to locate a creator method 820 appropriate to create a protocol object associated with facilitating communications via the HTTP protocol. The creator method 820 can be, for example, the HTTP_WEB_REQUEST method. Also, for example, the prefix "ftp" in a URI ftp://www.abc.com/123.ftp may be employed as an identifier in the registry 810. The identifier can be employed to locate a creator method 830 appropriate to create a protocol object associated with facilitating communications via the FTP protocol. The creator method 830 can be, for example, the FTP_WEB_REQUEST method.

By employing the registry 810 and the identifiers stored in the registry 810 to locate methods implementing methods defined in the interface 850, the present invention facilitates adding creator methods that can be employed to create protocol objects associated with new protocols, with such addition not requiring changes to an application employing such creator methods. The registry 810 can be updated, and a new creator method can be added without requiring rewriting and/or recompilation of an application (e.g., 510, FIG. 5), thus mitigating complexity and lifespan problems associated with conventional systems.

Figure 9:
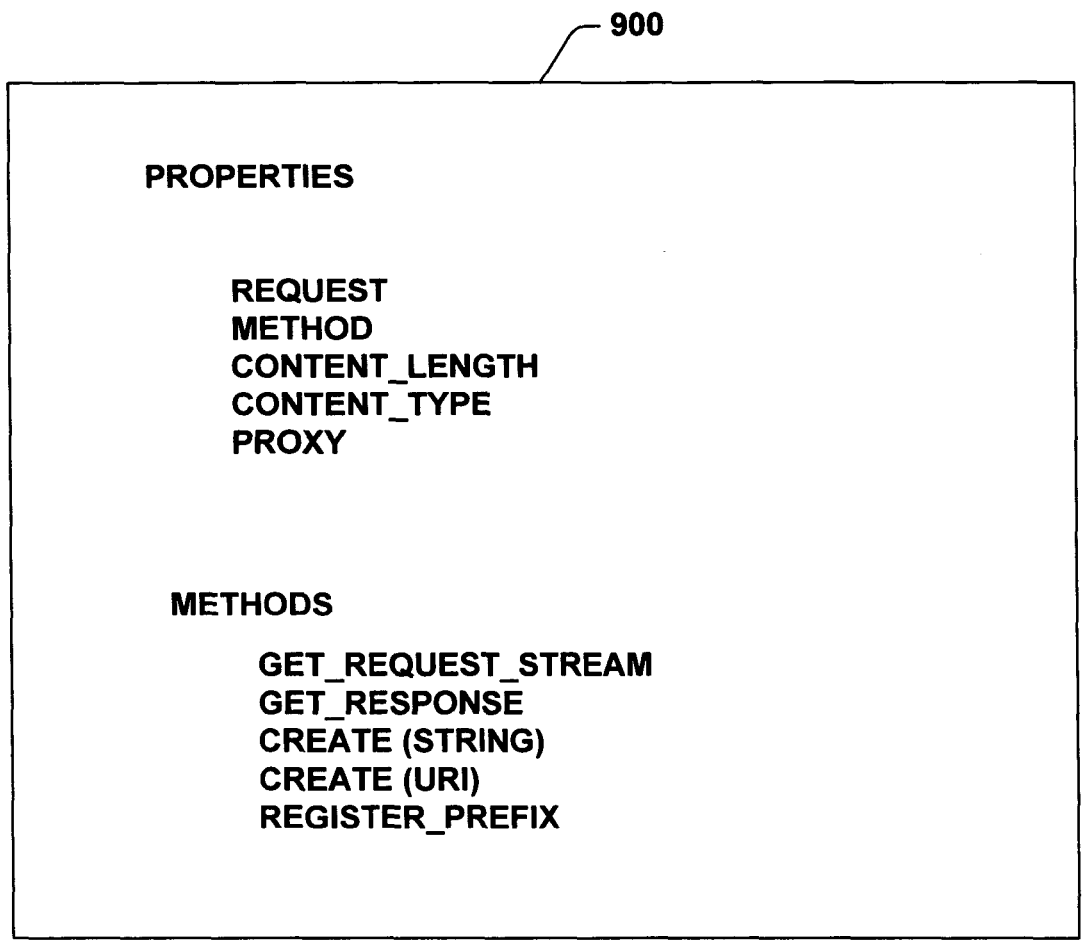
FIG. 9 illustrates an exemplary abstract base class definition for an object designed to simplify writing data to a resource, in accordance with an aspect of the present invention.

FIG. 9 illustrates an exemplary abstract base class definition 900 for an object designed to simplify writing data to a resource and/or for submitting a request for content. The abstract base class can be, for example a WEB_REQUEST object, which can be cast to any implementing class, including, but not limited to, an HTTP_WEB_REQUEST object, an FTP_WEB_REQUEST object and an SMTP_WEB_REQUEST object.

The base class definition 900 can include properties and methods. The properties can include, but are not limited to, a request property, a method property, a content_length property, a content_type property and a proxy property. The methods can include, but are not limited to, a get_request_stream method, a get_response method, a create (string) method, a create (URI) method and a register_prefix method. While five properties and five methods are illustrated in FIG. 9, it is to be appreciated by one skilled in the art that a greater or lesser number of properties and/or methods can be employed in a writing object in accordance with the present invention.

The request property may hold, for example, a URI for a resource associated with the writing object. The method property may hold, for example, an identifier of a protocol method employed by the writing object. The content_length property may hold, for example, the length of the data portion of a protocol request packet. The content_type property may hold, for example, the type of content associated with a protocol request packet. The proxy property can hold, for example, a proxy address through which a protocol request should be sent. Thus, data stored in the properties can be employed to facilitate communications via a protocol by storing information employed in facilitating such communications. Storing such information in a protocol object implementing a base class facilitates reducing program complexity by removing such protocol specific information from an application program, thus mitigating complexity problems associated with conventional systems.

The get_request_stream method may be employed, for example, to return an object that can be employed to write data to a protocol object via a byte stream. The stream object can be employed for communication methods including, but not limited to, synchronous (e.g., requests synchronized with following responses with no intervening requests and/or responses) and asynchronous methods (e.g., request and responses may have intervening requests and/or responses and responses may be delivered out of order). The get_response method may be employed, for example, to return a protocol object that provides a byte stream interface to messages received from a resource via a protocol. The protocol object may be, for example, a WEB_RESPONSE object. The create (string) method can be employed, for example, to produce a protocol object based, at least in part, on the value of the string passed to the create method. Similarly, the create (URI) method can be employed, for example, to produce a protocol object based, at least in part, on the value of the URI passed to the create method. The URI may have been provided to an application as an input parameter (e.g., command line, read from file, provided through interactive method). By way of illustration, the create (URI) method, when invoked by the call create ("http") may cause a create ( ) method implemented in an HTTP_WEB_REQUEST class object to be invoked to create a protocol object that facilitates communicating via an HTTP protocol.

The register_prefix method can be employed, for example, to register a prefix in a class factory data store (e.g., 640, FIG. 6) to facilitate invoking an appropriate creator based on an identifier. By way of illustration, if a new protocol (e.g., the XYZ protocol) was created, and a constructor associated with the XYZ protocol was created, the constructor operable to produce an XYZ protocol class object, then the register_prefix (XYZ, XYZ_WEB_REQUEST::CREATE( )) method may be employed to update a class factory data store (e.g., 640, FIG. 6) to facilitate invoking the XYZ_WEB_REQUEST::CREATE( ) method when a program desires to communicate with a resource reachable via the XYZ protocol. Moving such functionality to methods implementing an abstract base class facilitates simplifying programs and thus mitigates complexity problems associated with conventional systems.

Figure 10:
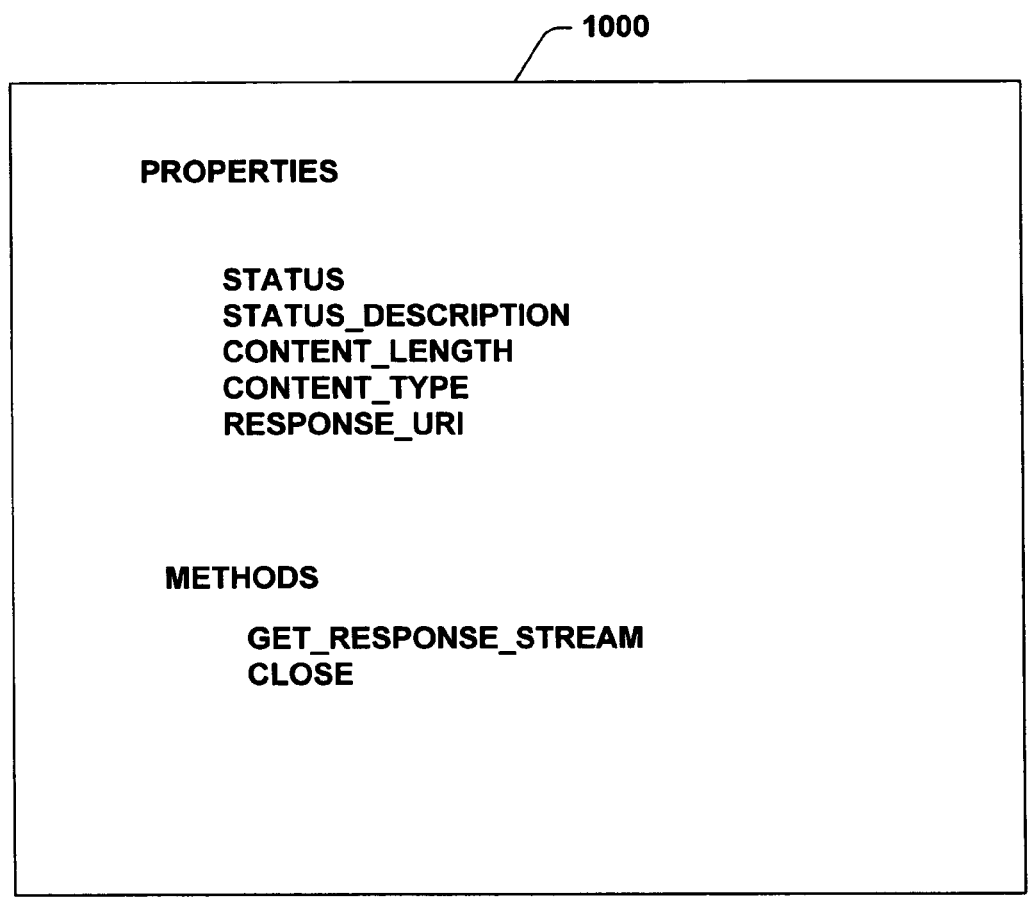
FIG. 10 illustrates an exemplary abstract base class definition for an object designed to simplify reading data from a resource, in accordance with an aspect of the present invention.

FIG. 10 illustrates an exemplary abstract base class definition 1000 for an object designed to simplify reading data from a resource and/or for processing a server response. The abstract base class may include properties and methods. The properties can include, but are not limited to, a status property, a status_description property, a content_length property, a content_type property and a response_uri property. The methods can include, but are not limited to, a get_response_stream method and a close method.

The status property may hold, for example, a status code associated with a server response (e.g., HTTP 404 error code). The status_description property may hold, for example, a string describing the response status code (e.g., "page not found"). The content_length property may hold, for example, the length of the response from the server. The response_uri may hold, for example, a URI that was associated with a response from a server. Thus, data stored in the properties can be employed to facilitate communications via a protocol by storing information employed in facilitating such communications. Storing such information in properties in a protocol object that implements the abstract base class facilitates reducing program complexity by removing such protocol specific information from an application program, thus mitigating complexity problems associated with conventional systems.

The get_response_stream method may, for example, return a response stream object employed to read data from a resource. The close method may, for example, be employed to close a response stream object, thus severing communications with a resource. Moving such functionality to methods implementing an abstract base class facilitates simplifying programs and thus mitigates complexity problems associated with conventional systems.

Figure 11:
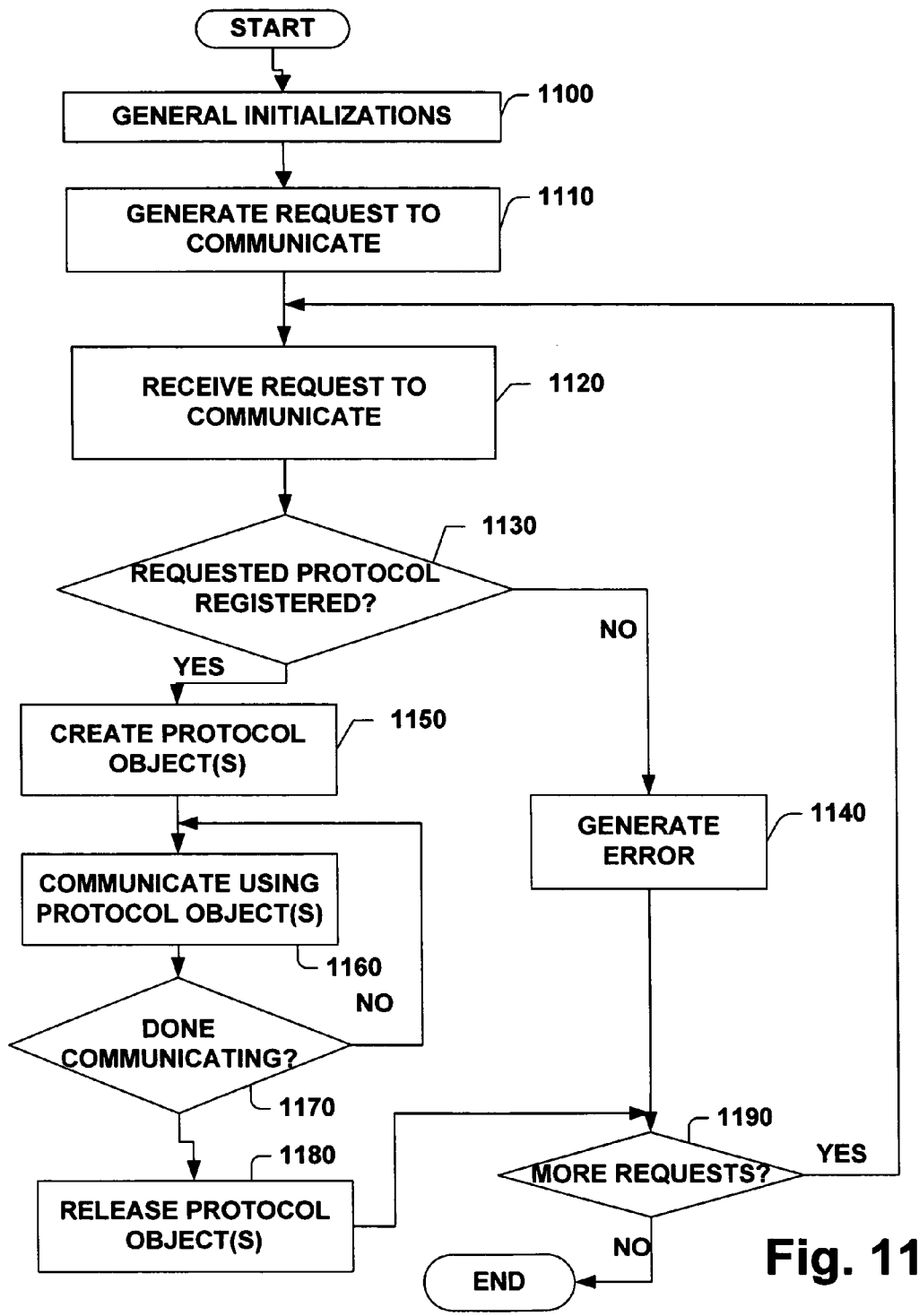
FIG. 11 is a flow chart illustrating an example methodology for practicing an aspect of the present invention.

In view of the exemplary systems shown and described above, methodologies, which may be implemented in accordance with the present invention, will be better appreciated with reference to the flow diagram of FIG. 11. While for purposes of simplicity of explanation, the methodology of FIG. 11 is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

FIG. 11 is a flow chart illustrating a method for facilitating communications with a resource. At 1100, general initializations occur. Such initializations include, but are not limited to, allocating memory, establishing pointers, establishing data communications, acquiring resources, setting variables and displaying process activity. At 1110, an application generates a request to communicate. The request of 1110 may include an identifier that can be employed to resolve which, if any, constructor will be employed to create a protocol object to facilitate the desired communication. At 1120, the request to communicate of 1110 is received, and an identifier associated with the request may be examined. At 1130, a determination is made concerning whether a protocol through which the desired communication can be made has been registered. If the determination at 1130 is NO, then at 1140 an error message can be generated and returned to the program requesting the communication. If the determination at 1130 is YES, then at 1150, one or more protocol objects can be created, the protocol objects being operable to facilitate the desired communication. By way of illustration, if the request of 1110 desired communication with an HTML resource, then a protocol object operable to facilitate communications over an HTTP protocol may be created. The determination of 1130 may be based, at least in part, on a URI and/or portion of a URI (e.g., prefix) associated with the request of 1110.

At 1160, the requested communication can be undertaken, such communication facilitated by employing the protocol object(s) created at 1150. At 1170 a determination is made concerning whether the requested communication is complete. If the determination at 1160 is NO, then processing can proceed at 1160. If the determination at 1160 is YES, then at 1180 the protocol object(s) created at 1150 may be released (e.g., deallocated, destructed). At 1190 a determination is made concerning whether there are any more requests to communicate. If the determination at 1190 is YES, then processing continues at 1120. If the determination at 1190 is NO, then processing concludes.

Figure 12:
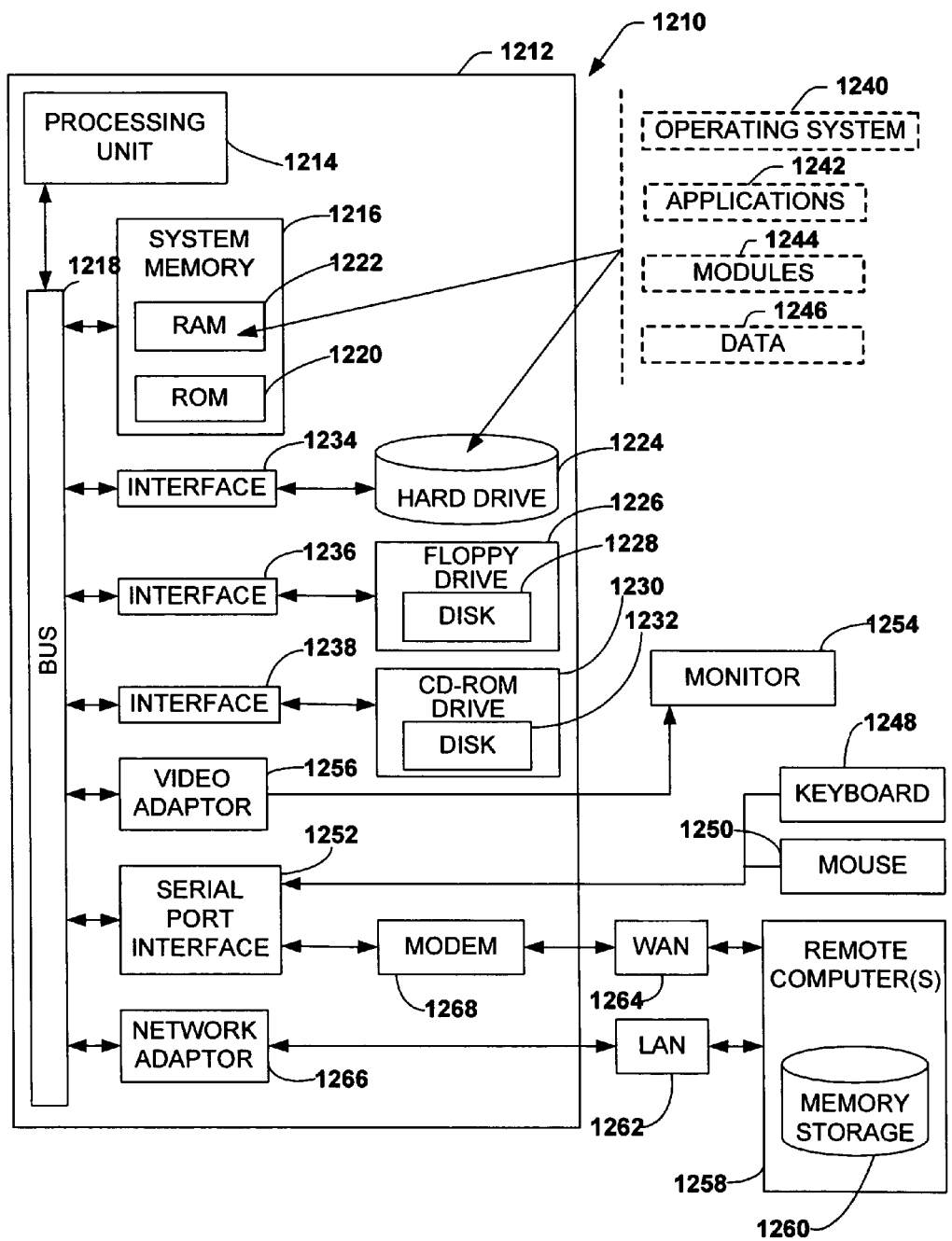
FIG. 12 is a schematic block diagram of an exemplary operating environment for a system configured in accordance with the present invention.

FIG. 12 is a schematic block diagram of an exemplary operating environment for a system configured in accordance with the present invention. In order to provide additional context for various aspects of the present invention, FIG. 12 and the following discussion are intended to provide a brief, general description of a suitable computing environment 1210 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, handheld computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 12, an exemplary environment 1210 for implementing various aspects of the invention includes a computer 1212, the computer 1212 including a processing unit 1214, a system memory 1216 and a system bus 1218. The system bus 1218 couples system components including, but not limited to, the system memory 1216 to the processing unit 1214. The processing unit 1214 may be any of various commercially available processors. Dual microprocessors and other multi-processor architectures also can be employed as the processing unit 1214.

The system bus 1218 can be any of several types of bus structure including a memory bus or memory controller, a peripheral bus and a local bus using any of a variety of commercially available bus architectures. The system memory 1222 includes read only memory (ROM) 1220 and random access memory (RAM) 1222. A basic input/output system (BIOS), containing the basic routines that help to transfer information between elements within the computer 1212, such as during start-up, is stored in ROM 1220.

The computer 1212 further includes a hard disk drive 1224, a magnetic disk drive 1226, (e.g., to read from or write to a removable disk 1228) and an optical disk drive 1230, (e.g., for reading a CD-ROM disk 1232 or to read from or write to other optical media). The hard disk drive 1224, magnetic disk drive 1226 and optical disk drive 1230 can be connected to the system bus 1218 by a hard disk drive interface 1234, a magnetic disk drive interface 1236 and an optical drive interface 1238, respectively. The drives and their associated computer-readable media provide nonvolatile storage of data, data structures, computer-executable instructions, etc. for the computer 1212, including for the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1222, including an operating system 1240, one or more application programs 1242, other program modules 1244 and program data 1246. It is to be appreciated that the present invention can be implemented with various commercially available operating systems or combinations of operating systems.

A user can enter commands and information into the computer 1212 through a keyboard 1248 and a pointing device, such as a mouse 1250. Other input devices (not shown) may include a microphone, an IR remote control, a joystick, a game pad, a satellite dish, cameras, in the sense of gesture interpreted through cameras and machine-vision software, a scanner, or the like. These and other input devices are often connected to the processing unit 1214 through a serial port interface 1252 that is coupled to the system bus 1218, but may be connected by other interfaces, such as a parallel port, a game port, a universal serial bus ("USB"), an IR interface, etc. A monitor 1254 or other type of display device is also connected to the system bus 1218 via an interface, such as a video adapter 1256. In addition to the monitor, a computer typically includes other peripheral output devices (not shown), such as speakers, printers etc.

The computer 1212 may operate in a networked environment using logical connections to one or more remote computers, such as a remote computer(s) 1258. The remote computer(s) 1258 may be a workstation, a server computer, a router, a personal computer, microprocessor based entertainment appliance, a peer device or other common network node, and typically includes many or all of the elements described relative to the computer 1212, although, for purposes of brevity, only a memory storage device 1260 is illustrated. The logical connections depicted include a local area network (LAN) 1262 and a wide area network (WAN) 1264. Such networking environments are commonplace in offices, enterprise-wide computer networks, intranets and the Internet.

When used in a LAN networking environment, the computer 1212 is connected to the local network 1262 through a network interface or adapter 1266. When used in a WAN networking environment, the computer 1212 typically includes a modem 1268, or is connected to a communications server on the LAN, or has other means for establishing communications over the WAN 1264, such as the Internet. The modem 1268, which may be internal or external, is connected to the system bus 1218 via the serial port interface 1252. In a networked environment, program modules depicted relative to the computer 1212, or portions thereof, may be stored in the remote memory storage device 1260. It will be appreciated that the network connections shown are exemplary and other means of establishing a communications link between the computers may be used.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising", as comprising is interpreted as a transitional word in a claim.

What is claimed is:

1. A method for allowing a computer program to communicate over one of a plurality of protocols, comprising:
   at a computing system, using one or more processors to execute computer executable instructions, wherein execution of the computer-executable instructions by the one or more processors causes the computing system to:
   register one or more protocol handlers operable to create a protocol object;
   receive a request to communicate;
   create an instance of a protocol object by employing a registered protocol handler;
   return the protocol object to an application; and
   use a base class Application Programming Interface (API) to communicate though the protocol object, wherein using the base class API includes implementing one or more methods defined in the base class API in a derived class, and wherein at least one of the one or more methods can be employed to read a first data from a resource, the first data having at least one of a format specific to the protocol and one or more headers and/or footers specific to the protocol when it is read from the resource, the first data being provided to a computer program of the computing system as a byte stream, and wherein at least one of the one or more methods can be employed to write a second data to the resource, the second data having at least one of a format specific to the protocol and one or more headers and/or footers specific to the protocol when it is written to the resource, the second data being provided to the one or more methods as a byte stream.

2. The method of claim 1, wherein the one or more processors further cause the computing, system to:
   use the computer program to generate a request to communicate, wherein the request to communicate identifies a Uniform Resource Identifier (URI) with which a communication is desired.

3. The method of claim 2, wherein creating an instance of a protocol object from a source of registered protocol handlers comprises:
   selectively determining one or more protocol object creators operable to create the protocol object based, at least in part, on a portion of the URI, where the protocol object creator implements one or more creator methods defined in an abstract creator base class; and
   invoking at least one of the one or more protocol object creators to create the protocol object.

4. The method of claim 3, wherein using the base class API to communicate though the protocol object further comprises:
   employing the one or more implemented methods.

5. One or more computer readable media having the computer executable instructions used by one or more processors to perform the method of claim 1.

6. A system that facilitates computer program communication over one of a plurality of protocols, comprising:
   one or more processors communicatively coupled to the following:
   an input component that, when executed by the one or more processors, receives a communication request from an application;
   an constructor component that, when executed by the one or more processors, ensures that a requested communication protocol is registered, and that generates at least one protocol object based upon a registered protocol; and
   a communication component that, when executed by the one or more processors, returns the at least one generated protocol object to the application and communicates with the application though the at least one protocol object via a base class Application Programming Interface (API), wherein the base class API defines one or more methods, and wherein the one or more methods include:
   at least one method that can be employed to read a first data from a resource, the first data having at least one of a format specific to the registered protocol and one or more headers and/or footers specific to the registered protocol when it is read from the resource, the first data being provided to a computer program of the computing system as a byte stream;
   at least one method that can be employed to write a second data to the resource, the second data having at least one of a format specific to the registered protocol and one or more headers and/or footers specific to the protocol when it is written to the resource. the second data being provided to the one or more methods as a byte stream.

7. The system of claim 6, wherein the communication component determines when a communication session has ended.

8. The system of claim 7, wherein the communication component releases the protocol object upon a determination that the communication session has ended.

9. The system of claim 8, wherein the released protocol object is destroyed upon release.

10. The system of claim 9, wherein the released protocol object is deallocated and stored upon release for potential future reallocation.

11. The system of claim 6, wherein the communication request comprises a Uniform Resource Identifier (URI) that identifies a resource with which the application is requesting communication.

12. The system of claim 11, wherein the constructor component examines the URI to determine which one of a plurality of constructors to employ in order to generate the at least one protocol object.

13. The system of claim 12, wherein the URI identifies at least one of a hypertext transfer protocol data source, a file transfer protocol data source, or a simple mail transfer protocol data source, with which the application is requesting communication.

14. A method for enabling a computer program to communicate one of a plurality of protocols, the method comprising:
using one or more processors to execute computer executable instructions, wherein execution of the computer executable instructions causes a computing system to:
register one or more protocol handlers operable to create a protocol object;
generate a request to communicate using a computer program, wherein the request to communicate identifies a Uniform Resource Identifier (URI) with which a communication is desired;
receive a request to communicate;
create an instance of a protocol object by employing a registered protocol handler by at least:
selectively determining one or more protocol object creators operable to create the protocol object based, at least in part, on a portion of the URI, where the protocol object creator implements one or more creator methods defined in an abstract creator base class, wherein at least one of the one or more methods can be employed to read a first data from a resource, the first data having at least one of a format specific to the protocol and one or more headers and/or footers specific to the protocol when it is read from the resource, the first data being provided to the computer program as a byte stream, and wherein at least one of the one or more methods can be employed to write a second data to the resource, the second data having at least one of a format specific to the protocol and one or more headers and/or footers specific to the protocol when it is written to the resource, the second data being provided to the one or more methods as a byte stream;
invoking at least one of the one or more protocol object creators to create the protocol object;
return the protocol object to the an application; and
use a base class Application Programming Interface (API) to communicate though the protocol object, by at least:
implementing one or more methods defined in the base class API in a derived class; and
employing the one or more implemented methods.

15. One or more computer readable media having the computer executable instructions used by one or more processors to perform the method of claim 14.

* * * * *